(12) United States Patent
Yamamichi

(10) Patent No.: US 11,829,673 B2
(45) Date of Patent: Nov. 28, 2023

(54) TRANSMISSION METHOD HAVING CLOUD PRINT SERVICE, MEDIUM, AND INFORMATION PROCESSING APPARATUS

(71) Applicant: CANON KABUSHIKI KAISHA, Tokyo (JP)

(72) Inventor: Masaki Yamamichi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/711,185

(22) Filed: Apr. 1, 2022

(65) Prior Publication Data
US 2022/0326897 A1 Oct. 13, 2022

(30) Foreign Application Priority Data
Apr. 7, 2021 (JP) ................... 2021-065365

(51) Int. Cl.
*G06F 3/12* (2006.01)

(52) U.S. Cl.
CPC ............ *G06F 3/1267* (2013.01); *G06F 3/121* (2013.01); *G06F 3/1203* (2013.01); *G06F 3/1238* (2013.01); *G06F 3/1285* (2013.01)

(58) Field of Classification Search
CPC .... G06F 3/1267; G06F 3/1203; G06F 3/1238; G06F 3/1285; G06F 3/1288
See application file for complete search history.

(56) References Cited

U.S. PATENT DOCUMENTS

| | | | |
|---|---|---|---|
| 8,659,777 B2 * | 2/2014 | Yokokura | ............. G06F 3/1267 358/1.15 |
| 8,675,234 B2 | 3/2014 | Sato | |
| 11,341,605 B1 * | 5/2022 | Singh | ......................... G06T 1/20 |
| 2009/0190166 A1 * | 7/2009 | Nakamura | ............ G06F 3/1239 358/1.15 |
| 2011/0238859 A1 * | 9/2011 | Kitagata | ................ G06Q 10/10 709/232 |
| 2012/0008164 A1 * | 1/2012 | Nanaumi | .............. G06F 3/1203 358/1.15 |
| 2013/0346361 A1 * | 12/2013 | Hashimoto | ............. G06F 16/16 707/808 |
| 2017/0094104 A1 * | 3/2017 | Fujiwara | ................. G06F 3/126 |
| 2018/0067701 A1 * | 3/2018 | Shirai | ................ G06K 15/1848 |
| 2019/0265929 A1 * | 8/2019 | Kitagata | ............... G06F 3/1203 |
| 2021/0306474 A1 * | 9/2021 | Hara | ................... H04N 1/00013 |
| 2021/0382671 A1 | 12/2021 | Yamamichi | |

FOREIGN PATENT DOCUMENTS

JP 2012-133489 A 7/2012

* cited by examiner

*Primary Examiner* — Benjamin O Dulaney
(74) *Attorney, Agent, or Firm* — VENABLE LLP

(57) ABSTRACT

A method for uploading print data for a cloud print service includes transmitting a first print job including first data to the cloud print service, uploading, if a terminal receives a response indicating that a data size of the first print job exceeds an upper limit of a data size of a print job supported by the cloud print service, the first data to a cloud storage service, generating a second print job including resource information for accessing the first data uploaded to the cloud storage service, and transmitting, to the cloud print service, the second print job including the resource information. If the terminal receives the response from the cloud print service, it is determined whether a first cloud storage service is accessible with the same authentication information as that for the cloud print service.

9 Claims, 10 Drawing Sheets

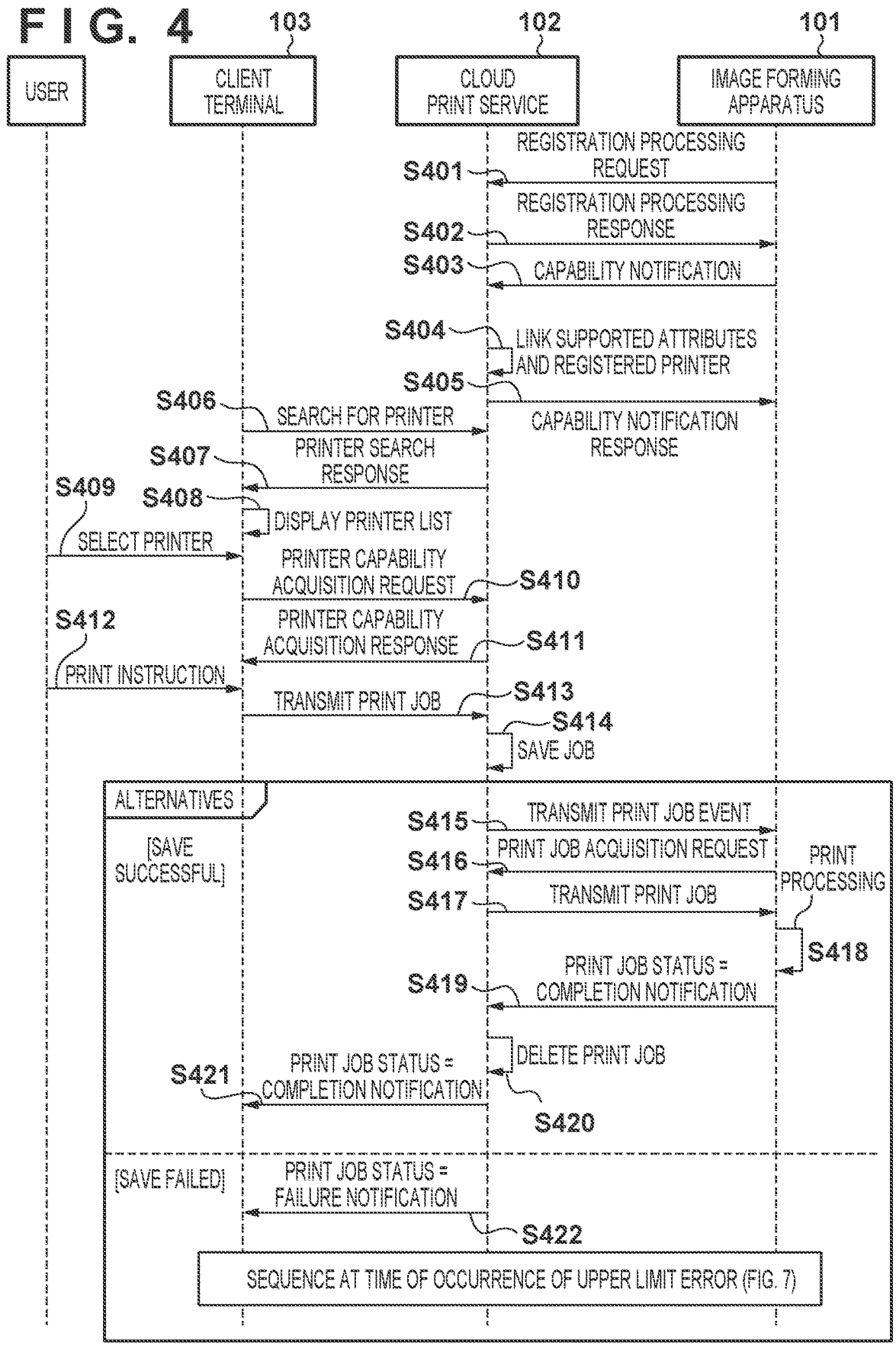

FIG. 5

| attribute | value |
|---|---|
| print-color-mode-supported | color |
| | monochrome |
| | auto |
| Finishing-surpported | none |
| | staple-top-left |
| | staple-top-right |
| | staple-bottom-left |
| | staple-bottom-right |
| | staple-dual-left |
| | staple-dual-right |
| | staple-dual-top |
| | staple-dual-bottom |
| document-format-supported | application/pdf |
| | image/pwg-raster |
| reference-uri-schemes-supported | http |
| | https |
| | ftp |
| | ipp |

FIG. 6

Operation : Print-Job Request document-format:application/pdf

Job-attributes-tag:
 Color-mode-supported : color
 finishing-supported : 28

Document Content: xxxxxxxxxxxxxxxxxxxx

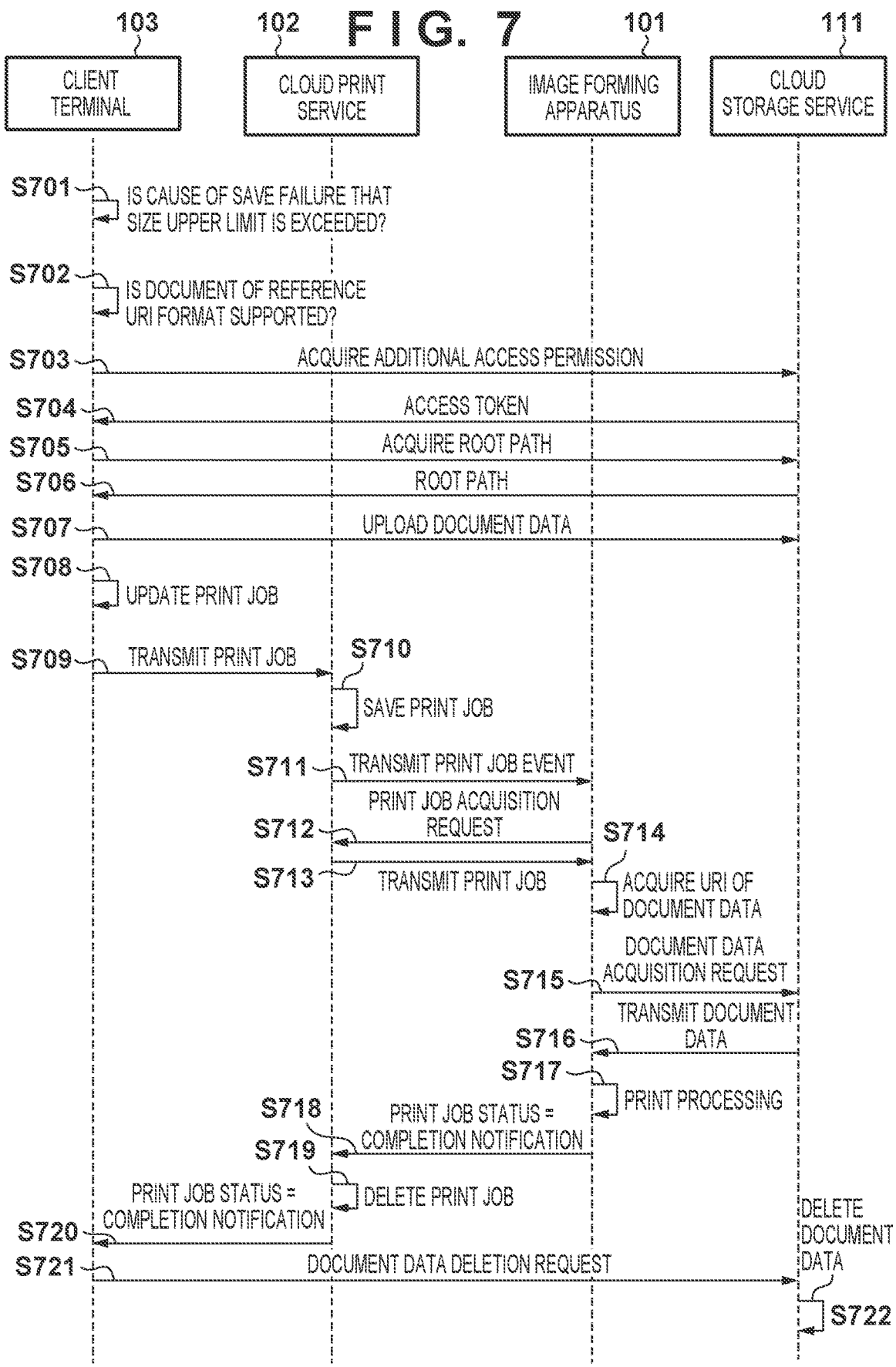

```
Operation : Print-URI Request
document-format:application/pdf
document-uri:https://xxxx/xxxx/xxx.pdf
AccessToken:xgjfakgakfdapfja:fdasfjapo Job-attributes-tag:
 Color-mode-supported : color
 finishing-supported : 28
```

FIG. 12

```
<Cloud Storage Setting>
  <Use Cloud Storage>Yes</Use Cloud Storage> ~1201
  <Storage Name>Cloud Storage1</Storage Name> ~1202
  <User Name>user</User Name> ~1203
  <PassWord>*****</PassWord> ~1204
</Cloud Storage Setting>
```

1200

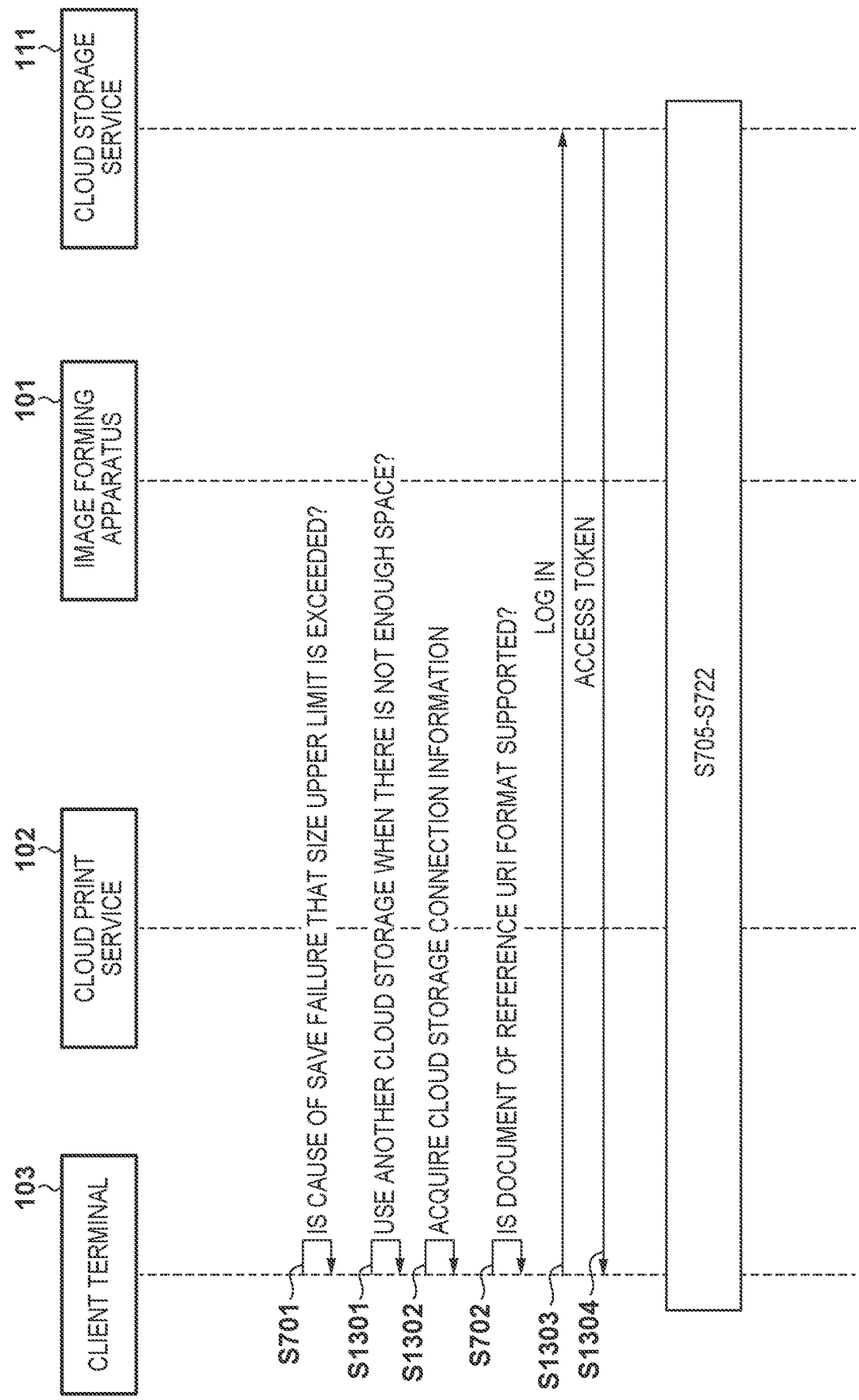

TRANSMISSION METHOD HAVING CLOUD PRINT SERVICE, MEDIUM, AND INFORMATION PROCESSING APPARATUS

BACKGROUND OF THE INVENTION

Field of the Invention

The present invention relates to a transmission method, a medium, and an information processing apparatus.

Description of the Related Art

In recent years, a cloud print service (CPS) for inputting a print job via a cloud and transmitting the print job to an image forming apparatus has become popular (see, for example, Japanese Patent Laid-Open No. 2012-133489). In such printing system, an administrator first registers an image forming apparatus in a tenant of a cloud print service to which the administrator belongs. The administrator sets a user belonging to the tenant to allow the use of the image forming apparatus. The tenant indicates one service system developed on the cloud.

The user allowed to use the image forming apparatus inputs a print job including document data and print settings from a client terminal to the cloud print service. The cloud print service saves the received print job in a storage. The image forming apparatus acquires the print job saved in the cloud print service, and executes printing. As a method of acquiring a print job, pull printing or push printing with respect to the cloud print service may be used.

As cloud print services, for example, there are known Google Cloud Print®, Microsoft Hybrid Cloud Print®, and uniFLOW Online®.

Since a number of print jobs are input and saved in the cloud print service, a storage capacity on the service side increases to hold a large amount of print jobs, thereby increasing the operation cost. To cope with this, a capacity limit per print job may be set in the cloud print service.

This capacity limit may cause a failure of execution of a large print job using the cloud print service. There arises a problem that when printing fails, if document data exists in the client terminal, and the client terminal and the image forming apparatus are not in the same LAN, the client terminal cannot print the large print job.

SUMMARY OF THE INVENTION

The present invention provides a printing system capable of executing printing regardless of the capacity limit of a cloud print service.

The present invention has the following arrangement. That is, according to an aspect of the present invention, there is provided a method for transmitting print data to a cloud print service, comprising: transmitting a first print job including first data to the cloud print service; uploading, if a data size of the first print job exceeds an upper limit of a data size of a print job supported by the cloud print service, the first data to a cloud storage service; and transmitting, to the cloud print service, a second print job including resource information for accessing the first data uploaded to the cloud storage service.

According to the present invention, it is possible to provide a printing system capable of executing printing regardless of the capacity limit of a cloud print service.

Further features of the present invention will become apparent from the following description of exemplary embodiments with reference to the attached drawings.

BRIEF DESCRIPTION OF THE DRAWINGS

FIG. 4 is a sequence chart of a registration processing of the image forming apparatus in the cloud print service;

FIG. 5 is a table showing an example of a list of attributes supported by the image forming apparatus;

FIG. 6 is a view showing an example of a packet at the time of execution of printing;

FIG. 7 is a sequence chart showing printing to the image forming apparatus according to the first embodiment;

FIG. 12 is a view showing an example of setting data at the time of an error; and FIG. 13 is a sequence chart showing printing to an image forming apparatus according to the second embodiment.

DESCRIPTION OF THE EMBODIMENTS

Figure 1:
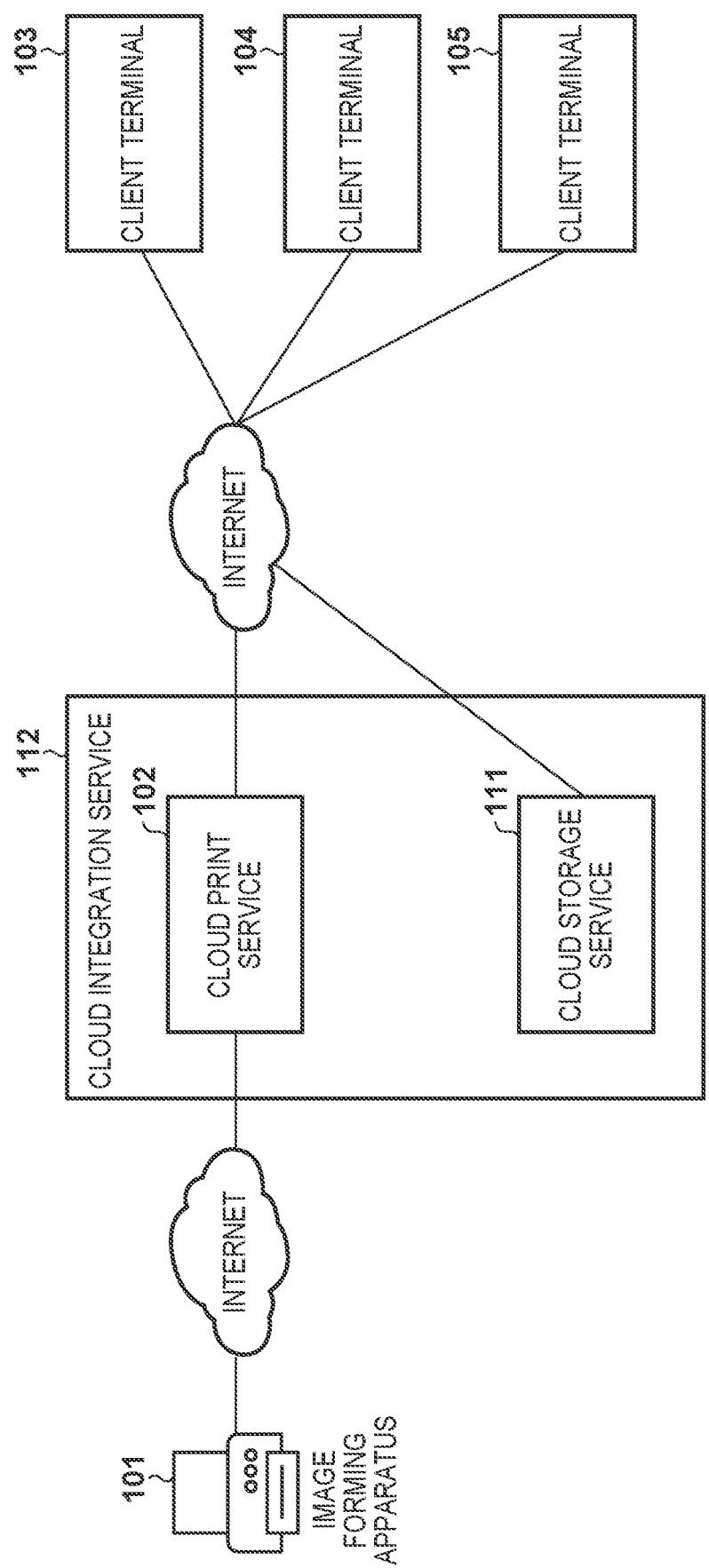
FIG. 1 is a block diagram showing a network configuration according to the first embodiment.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

<Network Configuration>

FIG. 1 is a block diagram showing the configuration of a printing system, an image forming system, or a cloud print system according to the embodiment of the present invention. Referring to FIG. 1, a cloud integration service 112 includes a cloud print service (CPS) 102 and a cloud storage service 111. Client terminals 103 to 105 as information processing apparatuses are connected to the CPS 102 and the cloud storage service 111 via a network such as the Internet. Each of the client terminals 103 to 105 can input a print job to the CPS 102. An image forming apparatus 101 is an apparatus that includes a print mechanism to perform print control, and is connected to the CPS 102 via a network such as the Internet. The image forming apparatus 101 can acquire a print job from the CPS 102 and execute print processing. The above-described constituent elements are communicably connected by the Internet.

The cloud storage service 111 is an online storage service, and provides a service that can manage document files and the like online. As cloud storage services, for example, there are known Google Drive of Google® LLC and One Drive® of Microsoft®. The cloud integration service 112 indicates a service that collectively provides the cloud print service 102, a cloud communication service (not shown), and the like. One of the provided services is the cloud storage service 111. Various services included in such service can be accessed by the same authentication information (user name (ID) and the like). As the cloud integration service 112, for example, there are known G Suite® of Google LLC and Microsoft 365®. The above-described constituent elements are communicably connected by the network.

The CPS 102 sets a capacity limit on an input print job. When an attempt is made to input a print job with print data whose size exceeds the capacity, the CPS 102 notifies the client terminal as the transmission source of the print job that the capacity limit is exceeded. The image forming apparatus 101 may be a single function device called a print apparatus or a printer or a multifunction device called an MFP or a multifunction copying machine.

<Hardware Arrangement of CPS and Client Terminal>

Figure 2:
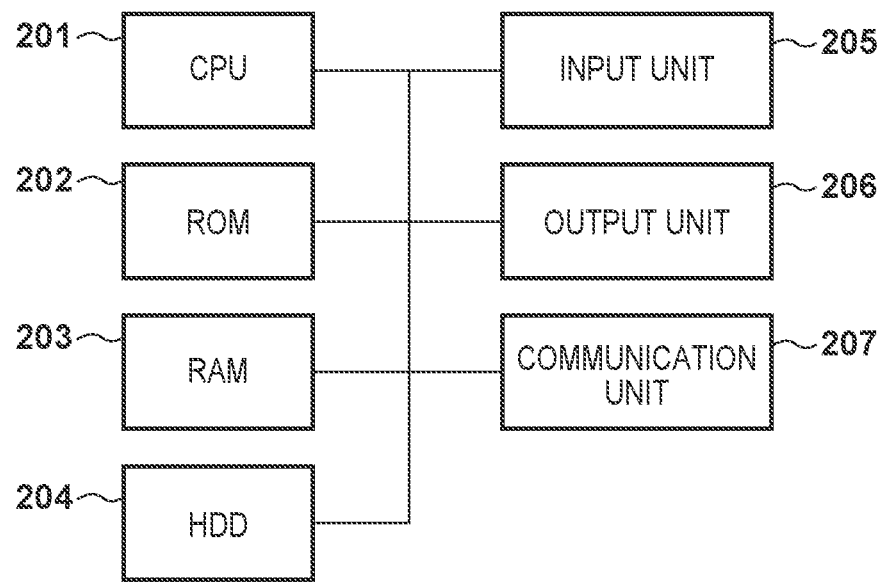
FIG. 2 is a block diagram showing an example of the hardware arrangement of a cloud print service and a client terminal.

FIG. 2 is a block diagram showing the hardware arrangement of the CPS 102 and the client terminal 103 or 104. A CPU 201 directly or indirectly controls each connected device (ROM, RAM, or the like), and executes a program for implementing control or a procedure to be described in this embodiment. A ROM 202 is a nonvolatile memory that stores a BIOS and the like. A RAM (direct storage device) 203 is used as a work area of the CPU 201 and is used as a primary storage to load a software module for implementing the present invention. An indirect storage device 204 is an HDD (Hard Disk Drive) that stores an OS as basic software and a software module, an SSD (Solid State Drive), or the like. The direct storage device 203 and the indirect storage device 204 may collectively be referred to as a storage unit or a storage device. An input unit 205 is a device used by the user to input data, such as a keyboard and a pointing device. As an output unit 206, for example, a display is used. A communication unit 207 is, for example, an interface for performing connection to a network such as a LAN.

<Hardware Arrangement of Image Forming Apparatus>

Figure 3:
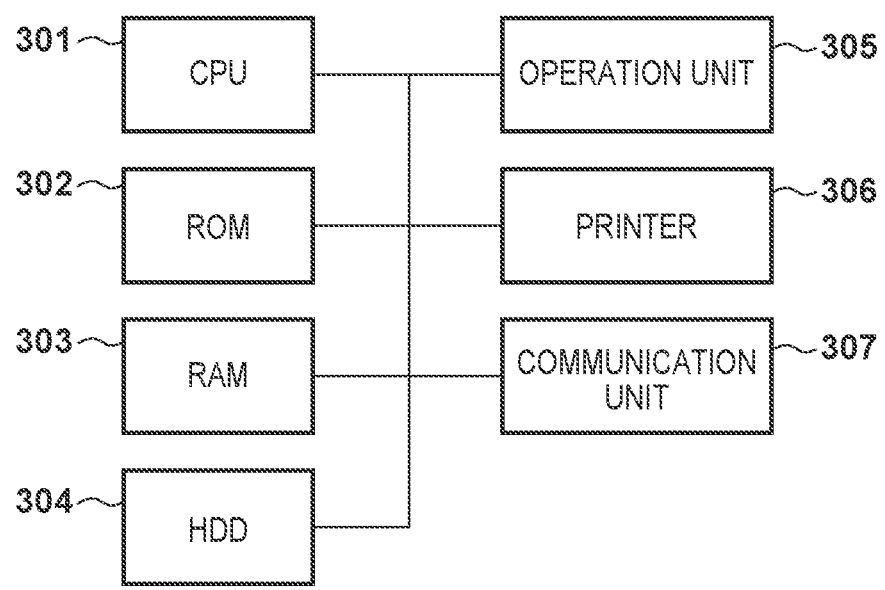
FIG. 3 is a block diagram showing an example of the hardware arrangement of an image forming apparatus.

FIG. 3 is a schematic block diagram showing the hardware arrangement of the image forming apparatus 101. Modules 301 to 304 play the same roles as those of the modules 201 to 204 shown in FIG. 2 and a description thereof will be omitted. An operation unit 305 serves as a display on which a touch operation can be performed. A printer unit 306 serves as a printer engine that prints print data received via a communication unit 307. The communication unit 307 serves as a network interface for performing connection to a network such as the Internet or an office LAN.

Registration of Image Forming Apparatus in Cloud Print Service

FIG. 4 is a sequence chart showing the processing procedure of registering the image forming apparatus in the cloud print service and executing printing. First, an administrator registers the image forming apparatus 101 in the CPS 102. For example, the administrator selects a "registration" button by selecting a CPS as a registration destination from the operation unit of the image forming apparatus 101, thereby executing a registration operation.

Upon detecting execution of registration from the administrator, the image forming apparatus 101 transmits, in S401, a registration processing request to the CPS 102. Assuming that the protocol of the registration processing complies with a protocol defined in the CPS, for example, a Register-Output-Device operation defined in PWG5100.22 or the like may be used. Upon receiving the registration processing request, the CPS 102 confirms registration request contents, and transmits, in S402, a registration processing request response to the image forming apparatus 101. If there is no problem in the registration processing request contents, a success response is transmitted; otherwise, a failure response is transmitted. This embodiment assumes that a success response is transmitted. In S403, the image forming apparatus 101 transmits, to the CPS 102, a capability notification including capability information supported by itself. The capability notification may be transmitted using an Update-Output-Device-Attributes operation defined in PWG5100.18 or the like.

In this embodiment, FIG. 5 shows, as an example, settings supported by the image forming apparatus 101. FIG. 5 shows attribute definition based on IPP (Internet Printing Protocol) in this embodiment. For example, an attribute "print-color-mode-supported" defined in IPP can take three values of "auto", "color", and "monochrome". A print setting corresponding to each value is a "color mode" setting, and can take "auto", color", or "monochrome". The "color mode" is a setting for selecting a color setting of printout. If "color" is selected, color output is done. If "monochrome" is selected, monochrome output is done. If "auto" is selected, color or monochrome output is done depending on the setting of the image forming apparatus.

An attribute "Finishing-supported" can take a numerical value, and a numerical value corresponding to finishing information supported by the image forming apparatus is stored. For example, "20" is associated with "staple-top-left" and "22" is associated with "staple-top-right". This numerical value is a "stapler setting" in the print settings, and indicates "staple-top-left" or "staple-top-right".

An attribute "document-format-supported" can take values of "application/pdf" and "image/pwg-raster". This attribute indicates a document format of a print job that can be accepted by the image forming apparatus at the time of printing. Each value indicates that a bitmap format of PDF or pwg-raster is accepted.

An attribute "reference-uri-schemes-supported" can take values of "http", "https", "ftp", and "ipp". This attribute indicates a format, in which a location is designated by a URI, supported as a method of designating document data of a print job that can be accepted by the image forming apparatus at the time of printing.

If the image forming apparatus 101 supports these attributes, contents of the corresponding attributes supported as a capability registration packet are declared in S403 as a capability notification to the CPS 102. Upon receiving the capability notification from the image forming apparatus 101, in S404 the CPS 102 confirms the contents of the received capability notification, and performs processing of linking the capability information with the registered image forming apparatus. By performing the above steps, the image forming apparatus 101 is registered in the CPS 102.

Printing by Image Forming Apparatus Registered in Cloud Print Service

Next, a sequence of transmitting a print job in the client terminal 103 will be described with reference to S406 to S414. The sequence to be described here is a procedure of printing, by the image forming apparatus, a print job accepted and held by the CPS 102. First, the user searches for the printers of the CPS 102 from the operation unit of the client terminal 103. Upon detecting a printer search instruction from the user, the client terminal 103 transmits, in S406, a printer search request to the CPS 102. The printers may be searched by a method of performing a search by designating all printers registered in the CPS 102 or a method of performing a search using filter conditions of a specific printer name, a location, and the like.

Upon receiving the search request from the client terminal 103, the CPS 102 transmits, in S407, printer information registered in the CPS 102 and matching the search request to the client terminal 103. Upon receiving a printer list information from the CPS 102, the client terminal 103 displays a printer list on the operation unit in S408. In S409, the user selects a desired printer from the printer list. Upon detecting the printer selection, the client terminal 103 transmits, in S410, a printer capability acquisition request to the CPS 102 to acquire more detailed specifications (capability) of the printer. The printer capability acquisition request may be transmitted using, for example, a Get-Printer-Attributes operation of IPP. Upon receiving the printer capability acquisition request, the CPS 102 transmits, in S411, a printer capability response of the CPS 102 to the client terminal 103. Thus, upon receiving the printer capability response, the client terminal 103 can display print settings based on the received printer specifications, and generate a print job in accordance with the capability.

In S412, the user presses a print button. Upon detecting the operation of instructing execution of printing, the client terminal 103 transmits, in S413, a print execution instruction to the CPS 102. An example of the print execution instruction is transmitted using, for example, a Print-Job operation of IPP. FIG. 6 shows an example of a packet of the print execution instruction in which "color" and "staple-dual-left" are designated in the print settings and the document format of the print job is PDF. The entity of the document data is stored in Document Content shown in FIG. 6.

Next, in S414, the CPS 102 analyzes the print execution request received from the client terminal 103, and saves the print job (including the document data and the print setting attributes) in the storage of itself.

Subsequently, a successive processing procedure depends on whether saving of the print job by the CPS 102 in S414 succeeds or not, and the successive processing procedures in a case in which saving succeeds and in a case in which saving fails will be described. The reasons for a save failure include a case in which the amount of data received from the client terminal 103 exceeds the upper limit of the data amount determined by the CPS 102. When saving of the print job fails because the upper limit of the data amount determined by the CPS 102 is exceeded, this may be referred to as a size upper limit error or occurrence of a size upper limit error.

<Print Processing Procedure in Case in which Saving Succeeds>

When saving succeeds, the CPS 102 notifies, in S415, the image forming apparatus 101 that the print job has been input. In FIG. 4, the CPS 102 sends a PUSH notification to the image forming apparatus 101. However, the image forming apparatus 101 may make a PULL notification to inquire about the presence/absence of an event of the CPS 102. For the notification, for example, a Get-Notification operation of IPP or the like is used. Upon detecting the presence of the print job in the CPS 102, the image forming apparatus 101 sends, in S416, a print job acquisition request to the CPS 102. The print job acquisition request is sent using, for example, a Fetch-Job operation of IPP or the like.

Upon receiving the print job acquisition request, the CPS 102 returns, in S417, as a response, the print job saved in the storage of itself. This causes the image forming apparatus 101 to execute printing, in S418, based on the designated print job attributes. Then, in S419, the image forming apparatus 101 notifies the CPS 102 of completion of printing. Upon receiving the print completion notification, the CPS 102 deletes, in S420, the print job saved in S414. Subsequently, in S421, the CPS 102 notifies the client terminal 103 of completion of the print job.

On the other hand, if saving of the print job fails in S414, the client terminal 103 is notified of the failure of the print job together with an error code indicating a cause (for example, the upper limit of the data amount is exceeded) of the failure (S422). A procedure after this notification will be described with reference to FIG. 7.

<Print Processing Procedure at Time of Occurrence of Size Upper Limit Error>

The processing procedure when saving of the print job by the CPS 102 in S414 fails because the data amount of the print job exceeds the predefined upper limit will be described with reference to FIG. 7.

Upon receiving, in S422, the notification that the print job has failed, the client terminal 103 refers, in S701, to the error code included in the notification, and determines whether the cause of the failure is that the size upper limit is exceeded. A case in which the error code indicates that the size upper limit is exceeded will be exemplified. The cause of the failure is not the case that the size upper limit is exceeded, an operation corresponding to the error is performed, thereby ending the processing.

If saving of the print job fails because the size upper limit is exceeded, the client terminal 103 refers, in S702, to the printer capability information acquired in S411. Then, based on the printer capability information, it is determined whether the image forming apparatus 101 supports the print job of the reference format of the document data in the cloud storage service 111. For example, the kinds of supported designation methods are acquired with reference to the attribute "reference-uri-schemes-supported" defined in IPP and shown in FIG. 5. Furthermore, it is determined whether the method matches the method of referring to the cloud storage service 111. If there exists the matching method, it is determined that the image forming apparatus supports the print job. This example assumes that "https" exists as a value of the attribute "reference-uri-schemes-supported", and a file in the cloud storage service 111 can be referred to by a URI in the https format.

Figures 8, 9:
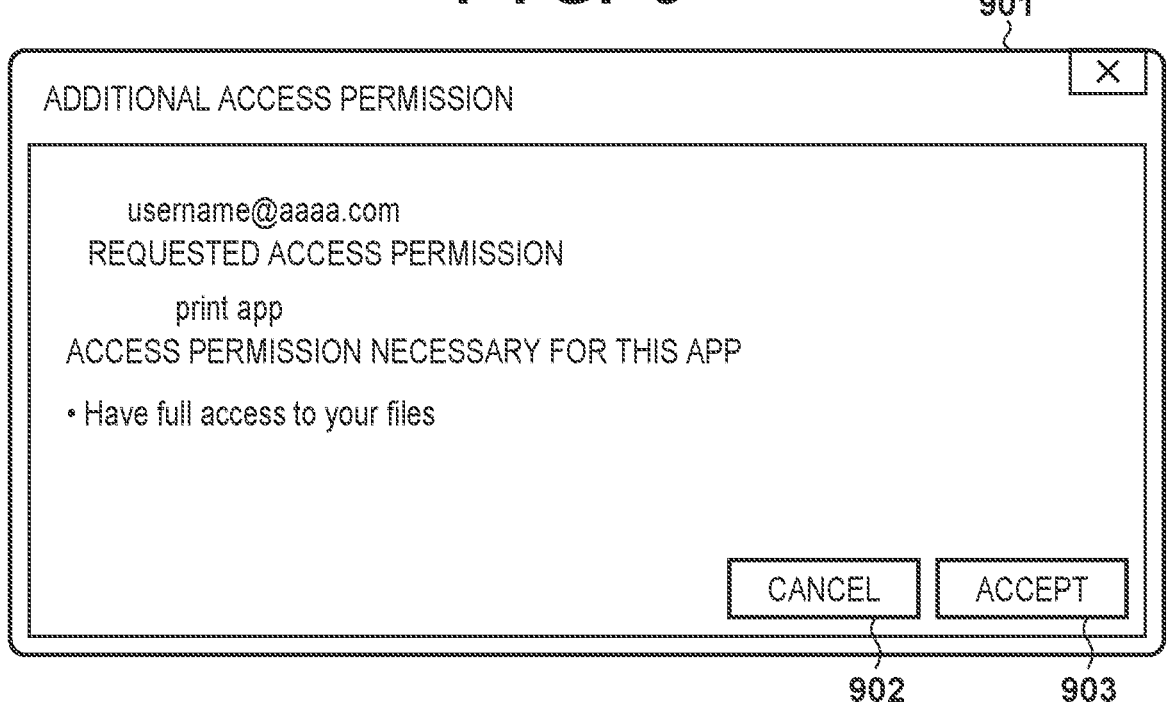
FIG. 8 is a view showing an example of a packet at the time of execution of printing.
FIG. 9 is a view showing an example of a user interface for requesting additional access permission according to the first embodiment.

In S703, the client terminal 103 requests additional access permission with respect to the reading/writing authority from/to the cloud storage service 111. Then, a dialog box for prompting the user to accept (that is, authenticate) the additional access permission is displayed, as shown in FIG. 9. In a dialog box 901, for example, the current user name, an application name requesting access, and the kind of requested access authority are displayed as information concerning the additional access permission. In FIG. 9, as described above, contents indicate that access authority to files managed by the user is additionally requested. If the user accepts the access permission, he/she presses (or touches) an accept button 903; otherwise, he/she presses a cancel button 902. When the accept button 903 is pressed, access authority is given to the application which has requested access authority, and the cloud storage service 111 returns, in S704, an access token as a response to the client terminal 103. In S703, for example, necessary user information or account information (a user name, a password, and the like) is transmitted together if it exists.

When the access authority is accepted (the access token is received), the client terminal 103 notifies, in S705, the cloud storage service 111 of a root path acquisition request for the saving destination of the files. Upon receiving the root path acquisition request, the cloud storage service 111 returns a root path as a response in S706. In the case of, for example, the https format, the root path is "https://my.cloudstrage/personal/username/Documents". If the user has no access authority to the cloud storage service 111, the cloud storage service 111 responds in a state in which there is no root path. In this case, this print processing procedure is terminated. This example assumes that the user has access authority and the above-described root path is returned as a response.

Upon receiving the root path response, the client terminal 103 generates, in S707, a URI of the saving destination of the document data to be printed, and uploads the document data to the saving destination URI of the cloud storage service 111. The saving destination URI may be an arbitrary URI as long as there is no existing file based on the root path. For example, "https://my.cloudstrage/personal/username/Documents/Printdocument1.pdf" or the like is used.

In S708, the client terminal 103 changes the document data of the print job to the reference format, and adds, to the print job, access information (for example, the access token) for allowing the image forming apparatus 101 to acquire the document data of the cloud storage service 111. In S709, the client terminal 103 transmits the print job to the CPS 102, and instructs execution of printing. The print execution instruction includes, for example, a Print-URI operation of IPP that can support the reference format of the document data. FIG. 8 shows an example of a packet of the print execution instruction in which "color" and "staple-dual-left" are designated in the print settings and the document format of the print job is PDF. The document data shown in FIG. 8 is stored in the reference format in the saving destination indicated by Document URI in the print job shown in FIG. 8. The print job also includes the access token.

Upon receiving the print job, in S710 the CPS 102 analyzes the print execution request received from the client terminal 103, and saves the print job (including no document data) in the storage of itself.

Subsequently, in S711, the CPS 102 notifies the image forming apparatus 101 that the print job has been input (print job event). In FIG. 7, the CPS 102 sends a PUSH notification to the image forming apparatus 101. However, the image forming apparatus 101 may make a PULL notification to inquire about the presence/absence of an event of the CPS 102. For the notification, for example, a Get-Notification operation of IPP or the like is used. Upon detecting the presence of the print job in the CPS 102, the image forming apparatus 101 sends, in S712, a print job acquisition request to the CPS 102. The print job acquisition request is sent using, for example, a Feteh-Job operation of IPP or the like. Upon receiving the print job acquisition request, the CPS 102 returns, in S713, as a response, the print job saved in the storage of itself.

This causes the image forming apparatus 101 to analyze, in S714, the print job, and acquire the URI of the storage destination of the document data since the document data is in the reference format. In S715, the image forming apparatus 101 requests the document data existing at the URI of the storage destination of the document data. In this example, because of the URI of the storage destination of the document data, the image forming apparatus 101 requests the cloud storage service 111 to acquire the document data. At this time, the image forming apparatus 101 transmits the access token included in the print job together with the acquisition request. Upon receiving the acquisition request together with the access token, the cloud storage service 111 transmits, in S716, the document data to the image forming apparatus 101.

Upon receiving the response of the document data, the image forming apparatus 101 executes printing, in S717, based on the print job attributes designated in S713 and the document data transmitted in S716. In S718, the image forming apparatus 101 notifies the CPS 102 of completion of printing. Upon receiving the print completion notification, the CPS 102 deletes the saved print job in S719. Subsequently, in S720, the client terminal 103 is notified of completion of the print job. Upon receiving the print completion notification, the client terminal 103 notifies, in S721, the cloud storage service 111 of a document data deletion request. Upon receiving the document data deletion request, the cloud storage service 111 deletes the document data.

As described above, in this embodiment, if document data existing in the client terminal 103, whose amount exceeds the capacity limit of the CPS 102 is printed, printing is made executable by storing the document data in the cloud storage service 111 included in the cloud integration service 112. The cloud storage service 111 used is a service that can be used with the same user information as that for the CPS 102.

This makes it possible to print the document data whose amount exceeds the upper limit by using the cloud print service that sets the upper limit on the amount of printable document data. Since printing is executed by giving, to the image forming apparatus, access authority of the user to the cloud storage service to be used, the user need only accept giving access permission to the image forming apparatus in addition to the normal print procedure.

Second Embodiment

<Cooperation with Cloud Storage Service Requiring Another User Information>

In the first embodiment, the configuration in which the CPS 102 and the cloud storage service 111 exist in the cloud integration service 112 is adopted and the same user information (or account information) can be used. However, the cloud print service and the cloud storage service may be provided individually, and user information may be different. This embodiment will describe processing when document data existing in a client terminal 103, whose amount exceeds the capacity limit of a CPS 102, is printed in cooperation with a cloud storage service requiring user information different from that for the CPS 102. This makes it possible to print document data existing in the client terminal 103, whose amount exceeds the capacity limit of the CPS 102, in combination with an arbitrary cloud storage service.

<Network Configuration>

Figure 10:
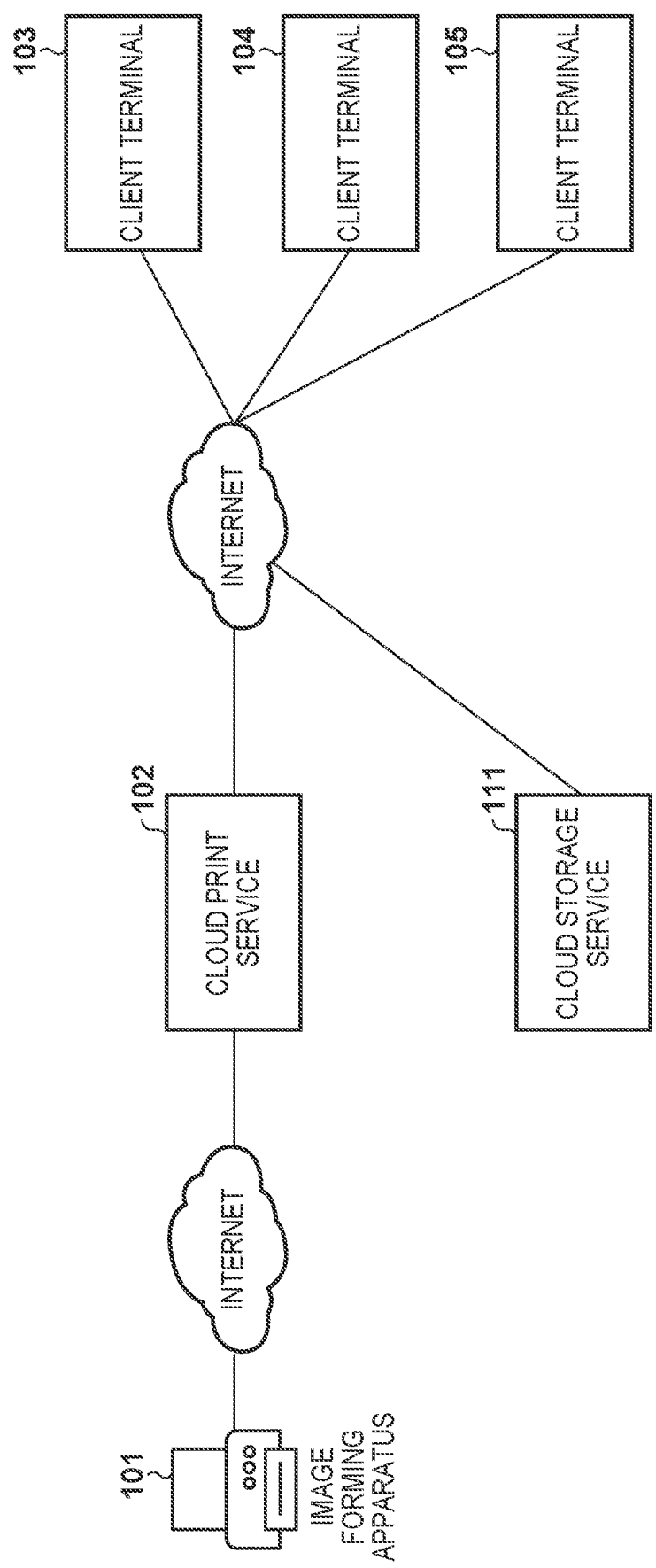
FIG. 10 is a block diagram showing a network configuration according to the second embodiment.

FIG. 10 is a block diagram showing a system configuration according to the embodiment of the present invention. FIG. 10 shows a configuration obtained by adding only a cloud storage service 111 to the configuration shown in FIG. 1. The cloud storage service 111 is an online storage service, and provides a service that can manage document files and the like online. Unlike the first embodiment, the CPS 102 and the cloud storage service 111 are not included in the same cloud integration service, and require different pieces of user information to be accessed. The above-described constituent elements are communicably connected by a network.

Figure 11:
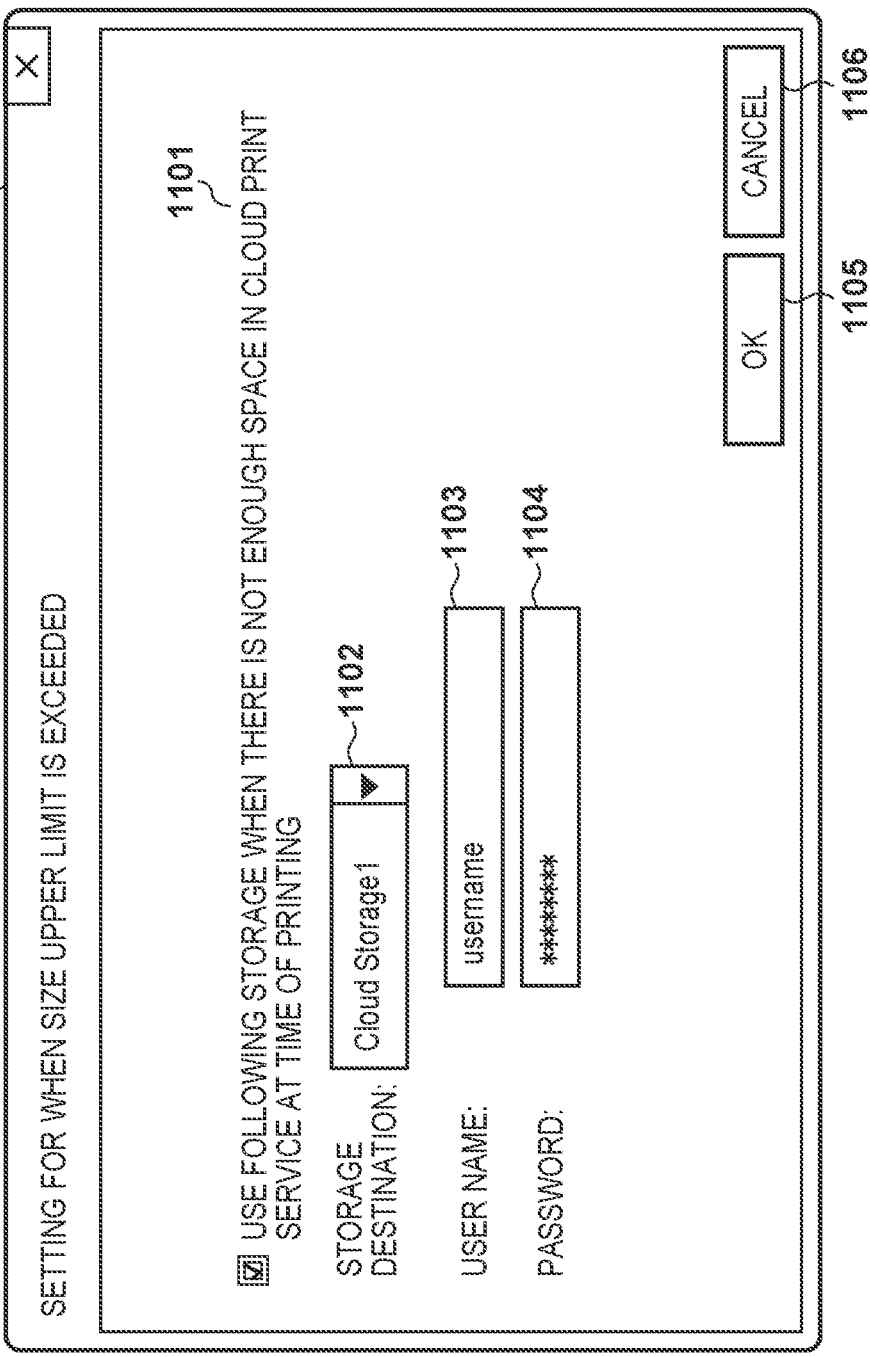
FIG. 11 is a view showing an example of a user interface for making settings at the time of an error according to the second embodiment.

FIG. 11 is a view showing an example of a setting dialog 1100 concerning the time of occurrence of a size upper limit error, which is displayed by a program operating on the client terminal 103 according to this embodiment. A check box 1101 is used to set whether to store document data of a print job in another cloud storage and print it when a size upper limit error occurs in the CPS 102 at the time of printing. A combo box 1102 is used to select a cloud storage as a document data storage destination. A user name 1103 and a password 1104 are used to perform connection to the cloud storage selected in the combo box 1102. The contents set in FIG. 11 are saved as a setting file 1200 in, for example, the XML, format shown in FIG. 12 in an HDD 204 of the client terminal 103. The program operating on the client terminal 103 is referred to by acquiring, from the HDD 204, the setting file saved in the HDD 204, and loading it into the RAM 203. The setting of the above-described check box 1101 is held in a use cloud storage tag 1201. If the check box 1101 is turned on, YES indicating that another cloud storage is used when a size upper limit error occurs in the CPS 102 is recorded. If the check box 1101 is OFF, NO is recorded. A storage name tag 1202 holds the cloud storage name selected in the storage destination combo box 1102, a user name tag 1203 holds the user name 1103, and a password tag 1204 holds the password 1104. Note that the password 1104 is recorded in an encrypted state, and is decrypted to be referred to at the time of loading. Note that in the combo box 1102, a list of cloud storage names registered in advance in linkage with the URIs of the cloud storages is displayed, and one of them is selected.

A processing procedure when a print job is transmitted to the CPS 102 and the CPS fails to save the job according to the second embodiment will be described with reference to FIG. 13. Note that FIG. 13 shows a processing procedure after notification (S422) has been made when the CPS has failed to save the job in S414 of FIG. 4, similar to FIG. 7, and the same step numbers as in FIG. 7 denote the same processes. A procedure after S705 is the same as in FIG. 7 and a description thereof will be omitted.

In S701, the client terminal 103 refers to an error code included in the notification from the CPS 102. If the cause of the failure is that the size upper limit is exceeded, the client terminal 103 refers to, in S1301, the setting file 1200 set in the setting dialog, shown in FIG. 11, concerning the time of occurrence of a size upper limit error. Then, based on the setting contents of the setting file 1200, it is determined whether to use an external cloud service. If the setting value is "YES", it is determined to use an external cloud service. Subsequently, the client terminal 103 acquires, in S1302, the cloud storage name of the connection destination, the user name, and the password. In S702, if it is determined, with reference to printer capability information acquired in S411, that the print job of the reference format of the document data can be supported, the client terminal 103 performs login processing to the cloud storage service 111 in S1303. The client terminal 103 transmits the user name and password acquired in S1302 to the cloud storage service 111 to automatically log in to the cloud storage service 111. To the contrary, a dialog for prompting the user to input the user name and the password may be displayed to perform login processing. Upon accepting the login processing, the cloud storage service 111 sends an access token to the client terminal 103 in S1304.

Processing after this processing is the same as in FIG. 7. Even if a size upper limit error occurs in the CPS 102, printing is implemented by uploading the document data to the cloud storage service 111, and instructing execution of printing of the document data in the print job in the reference format.

By adopting the configuration of this embodiment, it is possible to execute printing in combination with an arbitrary cloud storage service at the time of occurrence of a shortage of the capacity of the cloud print service. In addition, even if there is no cloud storage accessible with the same user information, if there exists a usable cloud storage, printing can be executed.

Furthermore, the cloud storage service accessible with the same user information is preferentially used, as in the first embodiment, and only when there is no such cloud storage service, another arbitrary cloud storage service may be used, as in the second embodiment. To do this, for example, a check box used to set that the cloud storage service accessible with the same user information is prioritized is provided in the dialog box 1100 shown in FIG. 11. Then, if the check box is checked, only the cloud storage service accessible with the same user information is displayed in the combo box 1102. This can preferentially use the cloud storage service accessible with the same user information as that for the CPS. A method is not limited to this, as a matter of course. For example, immediately after S702, the client terminal may determine the presence/absence of the corresponding cloud storage service, and if there exists the corresponding cloud storage service, the process may advance to S703. In this case, if there is no corresponding cloud storage service, the user may be prompted to designate a cloud storage service and input login information, and then the processing after S1303 may be executed using the cloud storage service corresponding to the input.

[Modification]

The above-described embodiment has exemplified a case in which a print job is transmitted and an error code included in the notification contents of the result of the transmission is determined, thereby determining whether a size upper limit error has occurred. On the other hand, the upper limit size of a print job processible by the CPS 102 may be acquirable in advance. In this case, before transmitting a job, the client terminal may determine whether a size upper limit error occurs, by comparing the data size of the print job with the size of a print job processible by the CPS 102 or a processible file size. In this case, for example, information of a job-k-octets-supported attribute defined in IPP and indicating the supported upper limit size of a job is acquired from the CPS 102. If the size of a print job to be transmitted is larger than the upper limit size acquired from the CPS 102, it is determined that a size upper limit error occurs. As the information used to determine whether the size upper limit is exceeded, information of a pdf-k-octets-supported attribute defined in PWG5100.16 may be used. This information indicates the acceptable upper limit size of a PDF file.

If the determination processing is performed based on the information indicating the upper limit size, which has been acquired in advance, it can be configured to compare, with the upper limit size, the actual size of a generated print job after the print job is generated. Alternatively, it may be configured to monitor the size of a print job during generation, and determine, at the timing when the size exceeds the upper limit size, that a size upper limit error occurs. Furthermore, it can be configured to predict the size of a print job from the size of a document file or drawing data to be printed and the like, and compare the predicted value with the upper limit size.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-065365, filed Apr. 7, 2021 which is hereby incorporated by reference herein in its entirety.

What is claimed is:

1. A method performed by a terminal for uploading print data for a cloud print service, comprising:
    transmitting a first print job including first data to the cloud print service;
    uploading, if the terminal has received from the cloud print service a response indicating that a data size of the first print job exceeds an upper limit of a data size of a print job supported by the cloud print service, the first data to a cloud storage service;
    generating a second print job including resource information for accessing the first data uploaded to the cloud storage service; and
    transmitting, to the cloud print service, the second print job including the resource information,
    wherein if the terminal has received the response from the cloud print service, it is determined whether or not a first cloud storage service is accessible with the same authentication information as that for the cloud print service;
    if the cloud storage service is not the first cloud storage service, a user input specifying a second cloud storage service and authentication information for the second cloud storage service is received, and
    the first data is uploaded to the first cloud storage service if the cloud storage service is the first cloud storage service, and the first data is uploaded to the second cloud storage service if the cloud storage service is not the first cloud storage service.

2. The method according to claim 1, wherein the second print job includes the resource information and print settings.

3. The method according to claim 1, wherein the cloud storage service is a cloud storage accessible with the same authentication information as that for the cloud print service.

4. The method according to claim 1, wherein
    the cloud storage service is a cloud storage service accessible with authentication information different from that for the cloud print service, and
    the first data is uploaded to the cloud storage service after acquiring the authentication information for the cloud storage service from a storage area and logging in to the cloud storage service using the acquired authentication information.

5. The method according to claim 4, further comprising:
    accepting input of authentication information; and
    storing the input authentication information in the storage area.

6. The method according to claim 1, further comprising determining whether a size of the first print job including the first data reaches the upper limit,
    wherein if it is determined that the size of the first print job including the first data reaches the upper limit, processing of uploading the first data to the cloud storage service and processing of transmitting the second print job are executed.

7. The method according to claim 1, wherein if an error indicating that the size has reached the upper limit is received from the cloud print service after a start of transmission of the first print job including the first data, processing of uploading the first data to the cloud storage service and processing of transmitting the second print job are executed.

8. A non-transitory computer-readable storage medium storing a computer-executable program for causing a computer to execute a method for uploading print data for a cloud print service, the method comprising:
    transmitting a first print job including first data to the cloud print service;
    uploading, if the computer has received from the cloud print service a response indicating that a data size of the first print job exceeds an upper limit of a data size of a print job supported by the cloud print service, the first data to a cloud storage service;
    generating a second print job including resource information for accessing the first data uploaded to the cloud storage service; and
    transmitting, to the cloud print service, the second print job including the resource information,
    wherein if the computer has received the response from the cloud print service, it is determined whether or not a first cloud storage service is accessible with the same authentication information as that for the cloud print service;
    if the cloud storage service is not the first cloud storage service, a user input specifying a second cloud storage service and authentication information for the second cloud storage service is received, and the first data is uploaded to the first cloud storage service if the cloud storage service is the first cloud storage service, and the first data is uploaded to the second cloud storage service if the cloud storage service is not the first cloud storage service.

9. An information processing apparatus comprising:

at least one memory that stores a set of instructions; and at least one processor that executes the instructions, the instructions, when executed, causing the information processing apparatus to perform operations comprising:

transmitting a first print job including first data to a cloud print service;

uploading, if the information processing apparatus has received from the cloud print service a response indicating that a data size of the first print job exceeds an upper limit of a data size of a print job supported by the cloud print service, the first data to a cloud storage service;

generating a second print job including resource information for accessing the first data uploaded to the cloud storage service; and transmitting, to the cloud print service, the second print job including the resource information, wherein if the information processing apparatus has received the response from the cloud print service, it is determined whether or not a first cloud storage service is accessible with the same authentication information as that for the cloud print service;

if the cloud storage service is not the first cloud storage service, a user input specifying a second cloud storage service and authentication information for the second cloud storage service is received, and the first data is uploaded to the first cloud storage service if the cloud storage service is the first cloud storage service, and the first data is uploaded to the second cloud storage service if the cloud storage service is not the first cloud storage service.

\* \* \* \* \*